United States Patent [19]

Kishida et al.

[11] Patent Number: 4,518,472

[45] Date of Patent: May 21, 1985

[54] DELUSTERING COATING COMPOSITION EXCELLENT IN ABRASION RESISTANCE

[75] Inventors: Kazuo Kishida; Isao Sasaki, both of Hiroshima; Kenji Kushi; Masahiro Sugimori, both of Otake, all of Japan

[73] Assignee: Mitsubishi Rayon Company Ltd., Tokyo, Japan

[21] Appl. No.: 525,895

[22] Filed: Aug. 24, 1983

[30] Foreign Application Priority Data

Sep. 10, 1982 [JP] Japan ............................... 57-156832
Sep. 11, 1982 [JP] Japan ............................... 57-157408
Sep. 13, 1982 [JP] Japan ............................... 57-157991

[51] Int. Cl.³ ..................... C08F 220/00; C08F 2/48; C08J 7/04; C09D 3/00
[52] U.S. Cl. ......................... 204/159.15; 204/159.16; 525/305
[58] Field of Search ................... 525/305; 204/159.15, 204/159.16

[56] References Cited

U.S. PATENT DOCUMENTS

| | | | |
|---|---|---|---|
| 3,898,301 | 8/1975 | Konishi et al. | 525/305 |
| 3,968,305 | 7/1976 | Oshima et al. | 204/159.23 |
| 4,012,559 | 3/1977 | Fujioka et al. | 525/305 |
| 4,064,199 | 12/1977 | Nishikawa | 204/159.15 |
| 4,101,493 | 7/1978 | Nakagawa et al. | 525/305 |
| 4,277,384 | 7/1981 | Arkens | 525/902 |
| 4,339,474 | 7/1982 | Kishida et al. | 204/159.16 |
| 4,367,245 | 1/1983 | Kishida et al. | 204/159.15 |
| 4,371,566 | 2/1983 | Russel | 525/305 |
| 4,388,345 | 6/1983 | Kishida et al. | 204/159.22 |
| 4,397,992 | 8/1983 | Johansson | 525/305 |

*Primary Examiner*—Herbert J. Lilling
*Attorney, Agent, or Firm*—Oblon, Fisher, Spivak, McClelland & Maier

[57] ABSTRACT

A coating composition curable by an activation energy ray, which comprises (a) 100 parts by weight of a monomer mixture (A) comprising at least 30% by weight of a compound having at least 3 acryloyloxy and/or methacryloyloxy groups in the molecule and up to 70% by weight of a compound having 1 to 2 $\alpha,\beta$-ethylenically unsaturated bonds in the molecule, (b) 0.01 to 6.0 parts by weight of at least one photosensitizer and (c) 0.5 to 30 parts by weight of an emulsion type crosslinked polymer or copolymer of a reactive monomer having one $\alpha,\beta$-ethylenically unsaturated bond in the molecule and a reactive monomer having at least two $\alpha,\beta$-ethylenically unsaturated bonds in the molecule.

24 Claims, No Drawings

DELUSTERING COATING COMPOSITION EXCELLENT IN ABRASION RESISTANCE

BACKGROUND OF THE INVENTION

1. Field of the Invention

The present invention relates to a delustering coating composition excellent in the abrasion resistance.

2. Description of the Prior Art

Molded articles of thermoplastic resins such as polymethyl methacrylate resins, polycarbonate resins, ABS resins, nylon resins and PET resins are ordinarily lustrous, and this property is important in some uses. However, there are many application fields in which delustered molded articles are preferred. Recently, matting plates and non-glaring plates in which reflected light is scattered to obtain a delustering effect without degradation of optical characteristics such as the total luminous transmittance have been used in various fields.

As the conventional means for delustering molded articles, there are adopted a method in which a molded article is coated with a paint in which fine particles of silica, titanium oxide or aluminum oxide are incorporated, a method in which these fine particles are incorporated into a resin and they are precipitated on the surface by some means at the molding step to deluster the surface, a method in which molding is carried out in a mold having fine convexities and concavities on the surface thereof, and a method in which cast polymerization is carried out in a cell having fine convexities and concavities on the surface thereof. A paint having silica, titanium oxide or aluminum oxide incorporated therein is defective in that when the paint is stored, the dispersion stability is degraded with the lapse of time and solid precipitates rendering re-dispersion difficult are formed, and the degree of the delustering effect is changed. In the method using a mold or cell for transfer of the surface pattern having fine convexities and concavities to the surface of a molded article, close attention should be paid to maintenance and control of the mold or cell, and this method is not completely advantageous. Furthermore, according to these conventional methods, delustered molded articles can tentatively be obtained, but since the abrasion resistance or the scratch resistance of the surfaces of the molded articles are inferior, the molded articles are readily damaged and the delustered surfaces are often impaired.

SUMMARY OF THE INVENTION

Research was conducted with a view to eliminating these disadvantages, and a coating composition was found comprising as main ingredients a crosslinked fine particulate emulsion type polymer and a specific polyfunctional acrylate which has an excellent delustering effect and provides a molded article having high abrasion resistance or scratch resistance. This coating composition has excellent storage stability. We have now completed the present invention based on this finding.

More specifically, in accordance with the present invention, there is provided a delustering coating composition curable by an activation energy ray, which is excellent in the abrasion resistance and scratch resistance, said coating composition comprising (a) 100 parts by weight of a monomer mixture (A) comprising at least 30% by weight of a compound having at least 3 acryloyloxy and/or methacryloyloxy groups in the molecule and up to 70% by weight of a compound having 1 to 2 $\alpha,\beta$-ethylenically unsaturated bonds in the molecule, (b) 0.01 to 6.0 parts by weight of at least one photosensitizer and (c) 0.5 to 30 parts by weight of an emulsion type crosslinked polymer or copolymer of a reactive monomer having one $\alpha,\beta$-ethylenically unsaturated bond in the molecule and a reactive monomer having at least two $\alpha,\beta$-ethylenically unsaturated bonds in the molecule.

DESCRIPTION OF THE PREFERRED EMBODIMENTS

In the present invention, the compound having at least 3 acryloyloxy and/or methacryloyloxy groups in the molecule is an indispensable component for improving the scratch resistance and abrasion resistance of the coating composition. In order to obtain a further improved abrasion resistance and scratch resistance, it is necessary that the compound having at least 3 functional groups should occupy at least 30% by weight of the monomer mixture (A), and it is preferred that the average molecular weight of the mixture (A) comprising the compound having at least 3 functional groups and the compound having 1 to 2 $\alpha,\beta$-ethylenically unsaturated bonds in the molecule be smaller than 300 per polymerizable unsaturated group. If the content of the compound having at least 3 acryloyloxy and/or methacryloyloxy groups in the molecule is lower than 30% by weight, or if the average molecular weight of the monomer mixture (A) exceeds 300 per polymerizable unsaturated group of even when the content of the above compound is higher than 30% by weight, a satisfactory abrasion resistance or scratch resistance is not always obtained.

As the compound having at least 3 acryloyloxy and/or methacryloyloxy groups in the molecule, there can be mentioned polyhydric alcohol polyacrylates and polymethacrylates such as trimethylol propane triacrylate, trimethylol propane trimethacrylate, trimethylol ethane triacrylate, trimethylol ethane trimethacrylate, pentaglycerol triacrylate, pentaglycerol trimethacrylate, pentaerythritol triacrylate, pentaerythritol trimethacrylate, pentaerythritol tetraacrylate, pentaerythritol tetramethacrylate, glycerin triacrylate, glycerin trimethacrylate, dipentaerythritol triacrylate, dipentaerythritol trimethacrylate, dipentaerythritol tetraacrylate, dipentaerythritol tetramethacrylate, dipentaerythritol pentaacrylate, dipentaerythritol pentamethacrylate, dipentaerythritol hexaacrylate, dipentaerythritol hexamethacrylate, tripentaerythritol tetraacrylate, tripentaerythritol tetramethacrylate, tripentaerythritol pentaacrylate, tripentaerythritol pentamethacrylate, tripentaerythritol hexaacrylate, tripentaerythritol hexamethacrylate, tripentaerythritol heptaacrylate and tripentaerythritol heptamethacrylate; saturated and unsaturated polyester polyacrylates and methacrylates of combination of malonic acid/trimethylol ethane/acrylic acid, malonic acid/trimethylol ethane/methacrylic acid, malonic acid/trimethylol propane/acrylic acid, malonic acid/trimethylol propane/methacrylic acid, malonic acid/glycerin/acrylic acid, malonic acid/glycerin/methacrylic acid, malonic acid/pentaerythritol/acrylic acid, malonic acid/pentaerythritol/methacrylic acid, succinic acid/trimethylol ethane/acrylic acid, succinic acid/trimethylol ethane/methacrylic acid, succinic acid/trimethylol propane/acrylic acid, succinic acid/trimethylol propane/methacrylic acid, succinic acid/glycerin/acrylic acid, succinic acid/glycerin/methacrylic acid, succinic acid/pentaerythritol/acrylic acid, succinic acid/pentaerythritol/methacrylic acid, adipic acid/trimethylol ethane/acrylic acid, adipic acid/trimethylol ethane/methacrylic acid, adipic acid/trimethylol propane/acrylic acid, adipic acid/trimethyl propane/methacrylic acid, adipic acid/pentaerythritol/acrylic acid, adipic acid/pentaerythritol/methacrylic acid, adipic acid/glycerin/acrylic acid, adipic acid/glycerin/methacrylic acid, glutaric acid/trimethylol ethane/acrylic acid, glutaric acid/trimethylolethane/methacrylic acid, glutaric acid/trimethylol propane/acrylic acid, glutaric acid/trimethylol propane/methacrylic acid, glutaric acid/glycerin/acrylic acid, glutaric acid/glycerin/methacrylic acid, glutaric acid/pentaerythritol/acrylic acid, glutaric acid/pentaerythritol/methacrylic acid, sebacic acid/trimethylol ethane/acrylic acid, sebacic acid/trimethylol ethane/methacrylic acid, sebacic acid/trimethylol propane/acrylic acid, sebacic acid/trimethylol propane/methacrylic acid, sebacic acid/glycerin/acrylic acid, sebacic acid/glycerin/methacrylic acid, sebacic acid/pentaerythritol/acrylic acid, sebacic acid/pentaerythritol/methacrylic acid, fumaric acid/trimethylol ethane/acrylic acid, fumaric acid/trimethylol ethane/methacrylic acid, fumaric acid/trimethylol propane/acrylic acid, fumaric acid/trimethylol propane/methacrylic acid, fumaric acid/glycerin/acrylic acid, fumaric acid/glycerin methacrylic acid, fumaric acid/pentaerythritol/acrylic acid, fumaric acid/pentaerythritol/methacrylic acid, itaconic acid/trimethylol ethane/acrylic acid, itaconic acid/trimethylol ethane/methacrylic acid, itaconic acid/trimethylol propane/acrylic acid, itaconic acid/trimethylol propane/methacrylic acid, itaconic acid/pentaerythritol/acrylic acid, itaconic acid/pentaerythritol/methacrylic acid, maleic anhydride/trimethylol ethane/acrylic acid, maleic anhydride/trimethylol ethane/methacrylic acid, maleic anhydride/glycerin/acrylic acid and maleic anhydride/glycerin/methacrylic acid; urethane acrylates obtained by reaction polyisocyanates such as trimethylol propane toluylene diisocyanate and a polyisocyanate represented by the following formula:

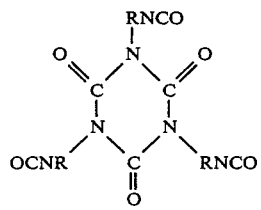

wherein R stands for a residue of hexamethylene diisocyanate, tolylene diisocyanate, diphenyl methane diisocyanate, xylylene diisocyanate, 4,4-methylene-bis(cyclohexyl isocyanate), isophorone diisocyanate or trimethylhexamethylene diisocyanate, with at least 3 moles, per molecule of the isocyanate, of active hydrogen-containing acrylic monomers such as 2-hydroxyethyl acrylate, 2-hydroxyethyl methacrylate, 2-hydroxypropyl acrylate, 2-hydroxypropyl methacrylate, 2-hydroxy-3-methoxypropyl acrylate, 2-hydroxy-3-methoxypropyl methacrylate, N-methylol acrylamide, N-methylol methacrylamide, N-hydroxyacrylamide and N-hydroxymethacrylamide according to customary procedures; and a triacrylate of tris-(2-hydroxyethyl)-isocyanuric acid and a trimethacrylate of tris-(2-hydroxyethyl)-isocyanuric acid.

Any of ordinary monomers having radical polymerization activity can be used as the compound having 1 to 2 α,β-ethylenically unsaturated bonds in the molecule. A compound having an acryloyloxy or methacryloyloxy group as the polymerizable unsaturated group is preferred because the compound has excellent ultraviolet ray polymerization activity. As specific examples of the compound having 2 acryloyloxy or methacryloyloxy groups, there can be mentioned diacrylates and dimethacrylates such as ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, 1,4-butane diol diacrylate, 1,4-butane diol dimethacrylate, 1,6-hexane diol diacrylate, 1,6-hexane diol dimethacrylate, neopentyl glycol diacrylate, neopentyl glycol dimethacrylate, propylene glycol diacrylate, propylene glycol dimethacrylate, dipropylene glycol diacrylate and dipropylene glycol dimethacrylate; urethane acrylates obtained by reacting diisocyanates such as tolylene diisocyanate, xylylene diisocyanate, naphthalene diisocyanate, hexamethylene diisocyanate, tetramethylene diisocyanate, lysine diisocyanate and 4,4'-diphenylmethane diisocyanate with 2 moles, per molcule of the isocyanate, of active hydrogen-containing acrylic monomers such as 2-hydroxyethyl acrylate, 2-hydroxyethyl methacrylate, 2-hydroxypropyl acrylate, 2-hydroxypropyl methacrylate, 2-hydroxy-3-methoxypropyl acrylate, 2-hydroxy-3-methoxypropyl methacrylate, N-methylol acrylamide, N-methylol methacrylamide, N-hydroxyacrylamide and N-hydroxymethacrylamide according to customary procedures; and compounds represented by the following general formula:

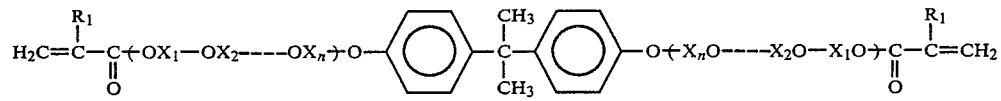

wherein $R_1$ stands for a hydrogen atom or a methyl group, $X_1$, $X_2$, - - - $X_n$, which may be the same or different, stand for an alkylene group having up to 6 carbon atoms, in which one hydrogen atom may be substituted with a hydroxyl group, and n is an integer of from 0 to 5, such as 2,2-bis(4-acryloxyphenyl)propane, 2,2-bis(4-methacryloxyphenyl)propane, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, 2,2-bis(4-acryloxypropoxyphenyl)propane, 2,2-bis(4-methacryloxypropoxyphenyl)propane, 2,2-bis[4-acryloxy(2-hydroxypropoxy)phenyl]propane, 2,2-bis[4-methacryloxy(2-hydroxypropoxy)phenyl]propane, 2,2-bis[4-acryloxy(2-hydroxypropoxyethoxy)phenyl]propane and 2,2-bis[4-methacryloxy(2-hydroxypropoxyethoxy)phenyl]propane.

As the compound having one acryloyloxy or methacryloyloxy group, there can be mentioned methyl acrylate, methyl methacrylate, propyl acrylate, propyl methacrylate, butyl acrylate, isobutyl acrylate, t-butyl acrylate, 2-ethylhexyl acrylate, lauryl acrylate, tridecyl acrylate, cyclohexyl acrylate, 2-hydroxyethyl acrylate, 2-hydroxypropyl acrylate, glycidyl acrylate, tetrahydrofurfuryl acrylate, benzyl acrylate, 1,4-butylene glycol monoacrylate, ethoxyethyl acrylate, ethylcarbitol acrylate, 2-hydroxy-3-chloropropyl acrylate, acrylamide, N-hydroxymethylacrylamide, N-hydroxymethylmethacrylamide, N-hydroxyethylacrylamide, N-hydroxyethylmethacrylamide, N-hydroxypropylacrylamide, N-hydroxypropylmethacrylamide, N-hydroxybutylacrylamide, N-hydroxybutylmethacrylamide, hydroxymethyldiacetone acrylamide and N-hydroxyethyl-N-(methyl)acrylamide.

Among the above-mentioned compounds having at least 3 acryloyloxy and/or methacryloyloxy groups, compounds represented by the following general formula (I):

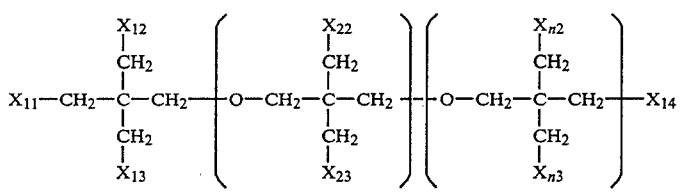

wherein at least 3 of $X_{11}$, $X_{12}$, $X_{13}$, $X_{22}$, $X_{23}$, - - -, $X_{n2}$, $X_{n3}$ and $X_{14}$ are groups $CH_2=CH-COO-$, the remaining groups are hydroxyl, amino, alkylene or substituted alkylene groups, and n is an integer of from 2 to 5, such as dipentaerythritol triacrylate, dipentaerythritol tetraacrylate, dipentaerythritol pentaacrylate and dipentaerythritol hexaacrylate, are especially preferred because they are excellent in the curability with ultraviolet rays in air.

As the compound having 1 to 2 acryloyloxy or methacryloyloxy groups, which shows excellent curability with ultraviolet rays in air when used in combination with the compound of the general formula (I), there are preferably used difunctional monomers represented by the following general formula (III):

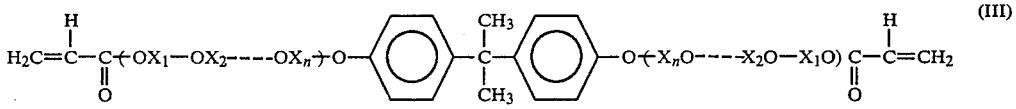

wherein $X_1$, $X_2$, - - - and $X_n$, which may be the same or different, stand for an alkylene group in which one hydrogen may be substituted with a hydroxyl group, and n is an integer of from 0 to 5.
such as 2,2-bis(4-acryloxyethoxyphenyl)propane, 2,2-bis(4-acryloxydiethoxyphenyl)propane, 2,2-bis(4-acryloxypropoxyphenyl)propane, 2,2-bis[4-acryloxy(2-hydroxypropoxy)phenyl]propane and 2,2-bis[4-acryloxy-(2-hydroxypropoxyethoxy)phenyl]propane, and monofunctional monomers, for example, acrylates having a hydroxyl group and/or a cyclic ether linkage and/or a linear ether linkage on the side chain, such as 2-hydroxyethyl acrylate, 2-hydroxypropyl acrylate, glycidyl acrylate, tetrahydrofurfuryl acrylate, ethoxyethyl acrylate, ethylcarbitol acrylate, butoxyethyl acrylate and 1,4-butylene glycol monoacrylate, because these compounds are ordinarily excellent in the activity of polymerization with ultraviolet rays in air.

When the polyfunctional acrylate represented by the general formula (I) is used in combination with a compound represented by the following general formula (II):

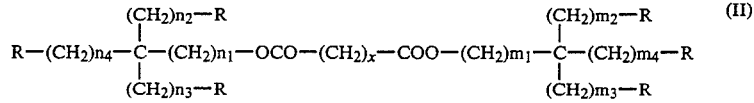

wherein at least 3 of groups R are groups $CH_2=CH-COO-$, the remaining groups R are $-H$, hydroxyl, amino, alkylene and substituted alkylene groups, $n_1$, $n_2$, $n_3$, $n_4$, $m_1$, $m_2$, $m_3$ and $m_3$ and $m_4$ are 0, 1 or 2, and x is a positive integer of from 1 to 10,
such as esterification products synthesized from such combinations of compounds as malonic acid/trimethylol ethane/acrylic acid, malonic acid/trimethylol propane/acrylic acid, succinic acid/trimethylol ethane/acrylic acid, succinic acid/trimethylol propane/acrylic acid, adipic acid/trimethylol ethane/acrylic acid and adipic acid/trimethylol propane/acrylic acid, at a compound (I)/compound (II) ratio of from 5/1 to 1/5, the weatherability of the obtained delustered molded article is improved and appearance changes such as roughening, cracking, peeling and insufficient adhesion under accelerated exposure and natural exposure are prevented.

The emulsion type crosslinked polymer or copolymer delustering the resulting molded article as used in combination with the monomer mixture (A) is an emulsion type polymer or copolymer of a reactive monomer having one $\alpha,\beta$-ethylenically unsaturated bond in the molecule and a reactive monomer having at least two $\alpha,\beta$-ethylenically unsaturated bonds in the molecule. Such polymers or copolymers may be prepared by conventional emulsion polymerization. In the case where an organic solvent is employed as one component of the coating composition, it is preferred that the emulsion type crosslinked polymer or copolymer is highly crosslinked. Preferably, the polymer or copolymer is a polymer of 75 to 99% by weight of the reactive monomer having one α,β-ethylenically unsaturated bond in the molecule and 1 to 25% by weight of the reactive monomer having at least two α,β-ethylenically unsaturated bonds in the molecule.

More preferably, the emulsion type crosslinked polymer or copolymer is a multi-stage emulsion type crosslinked polymer or copolymer comprising an inner layer composed of a copolymer of 85 to 99.9% by weight of a reactive monomer having one α,β-ethylenically unsaturated bond in the molecule and 0.1 to 15% by weight of a graft crosslinking agent having at least two α,β-ethylenically unsaturated bonds in the molecule and an outermost layer composed of a crosslinked copolymer of 75 to 99% by weight of a reactive monomer having one α,β-ethylenically unsaturated bond in the molecule and 1 to 25% by weight of a reactive monomer having at least two α, β-ethylenically unsaturated bonds in the molecule. Such a polymer has advantages in that it can easily form particles having a particle size larger than those obtained from a one stage emulsion type crosslinked polymer or copolymer, it can easily produce a satisfactory delustering effect, and in addition, its refractive indices in the inner and outer layers can easily be varied by changing the polymer composition in the inner and outer layers and, thus, the optical properties of the resultant delustered molded article can be changed as desired. It is further possible that the adhesion of the particles to a substrate and the size of the particles be controlled by slightly changing the swell characteristics of the polymers in the inner and outer layers, whereby changing the optical properties of the polymer particles.

The one stage emulsion type crosslinked polymer or copolymer particles is excellent in definition (or resolution) as discussed hereinafter but poor in delustering effect, while the multi-stage emulsion type crosslinked polymer or copolymer particles is excellent in delustering effect but poor in definition. However, if they are employed in combination in optional amounts, it is possible to obtain a composition in both the excellent definition and delustering effect. Thus, it may be optional that they are employed in a weight ratio of 9/1 to 1/9. If they are used in a ratio outside of the above-mentioned range, the resultant composition may be poor in either the definition or the delustering effect. Preferably, the one stage emulsion type crosslinked polymer or copolymer particles have a particles size of 0.05 to 0.3μ and the multi-stage emulsion type crosslinked polymer or copolymer particles have a particle size of 0.3 to 3.0μ. If these particles are employed in the above-mentioned proportions, the resultant composition may have extremely high definition and delustering effect.

The multi-stage emulsion type crosslinked polymer or copolymer may have three or four layers or more. However, two stage emulsion type crosslinked polymer having one inner layer and one outer layer may be sufficient in the point of view of the delustering effect and the workability in polymerization.

Any reactive monomers having at least two α,β-ethylenically unsaturated bonds in the molecule as mentioned hereinbelow may be employed as the graft crosslinking agent for binding the inner layer and the outer layer. Examples may include copolymerizable allyl, methallyl and crotyl esters of α,β-unsaturated carboxylic or dicarboxylic acids, preferably allyl esters of acrylic acid, methacrylic acid, maleic acid and fumaric acid. Especially, allyl methacrylate may attain excellent effect. Also, triallyl cyanurate and triallyl isocyanurate are especially useful. In such a graft crosslinking agent, the conjugated unsaturated bonds in the ester react much earlier than the allyl, methallyl or crotyl group so as to produce chemical bonds. On the other hand, the substantially major parts of the allyl, methallyl or crotyl groups effectively act during the polymerization of the reactants to constitute the next layer to produce graft bonds between the adjacent two layers.

Therefore, the graft crosslinking agent is indispensable to prepare the particles having multi-layer structure and the lower limit of the amount of the agent used is particularly important. If the amount is less than 0.1% of the inner layer copolymer, the effective degree of the graft bonding is low and, therefore, desired particles cannot be obtained. The reactive monomer having at least two α,β-ethylenically unsaturated bonds in the molecule in the outermost layer is important for the present invention. If the amount of the crosslinking agent is smaller than 1%, the fine particles are swollen or dissolved in the monomer mixture (A) or an organic solvent to be used in combination, and the viscosity of the coating composition is abnormally increased or the particle size is too large, with the result that a desirable delustered molded product cannot be obtained. If the amount of the crosslinking agent exceeds 25% by weight, polymerization for formation of fine particles becomes difficult and the particles do not uniformly adhere to the molded article. It is preferred that the amount of the crosslinking agent be 2 to 20% by weight.

If the particle size of the fine particles is smaller than 0.05μ, the luster becomes strong and a high delustering effect cannot be obtained. In contrast, if the particle size is larger than 3μ, the dispersion stability of the coating composition of the present invention is reduced, and if the coating composition is allowed to stand still for several days, fine particles are sedimented in the lower portion of the composition. In view of the luster-reducing effect and the standing stability of the coating composition, it is preferred that the particle size be 0.1 to 2.0μ.

Any of reactive monomers having 1 α,β-ethylenically unsaturated bond in the molecule can be used in the present invention, so far as it has a polymerization activity. In order to improve the compatibility with a crosslinked cured coating formed from the monomer mixture or to reduce the haze value by making the refractive index of the cured coating formed from the monomer mixture equal to that of the fine particles of the emulsion type crosslinked polymer or homopolymer, it is preferred that an alkyl ester of acrylic acid having 1 to 13 carbon atoms in the alkyl group, an alkyl ester of methacrylic acid having 1 to 4 carbon atoms in the alkyl group or an aromatic vinyl monomer be used as the reactive monomer, and it is especially preferred that the ratio of the alkyl ester of methacrylic acid and-/or the aromatic vinyl monomer to the alkyl ester of acrylic acid be in the range of from 99.5/0.5 to 40/60. If the alkyl ester of acrylic acid is copolymerized even in a small amount, the adhesion to the base resin is improved.

As examples of the foregoing monomer, there can be mentioned methyl acrylate, methyl methacrylate, ethyl acrylic, ethyl methacrylate, propyl acrylate, propyl methacrylate, n-butyl acrylate, n-butyl methacrylate, isobutyl acrylate, isobutyl methacrylate, t-butyl acrylate, t-butyl methacrylate, 2-ethylhexyl acrylate, cyclohexyl acrylate, lauryl acrylate, n-octyl acrylate, styrene and α-methylstyrene. These monomers may be used singly or in the form of a mixture of two or more of them.

As the reactive monomer having at least 2 $\alpha,\beta$-ethylenically unsaturated bonds in the molecule, the above-mentioned polyfunctional monomers having two or at least three acryloyloxy and/or methacryloyloxy groups in the molecule may be used, so far as they have a polymerization activity. However, there are preferably used alkylene glycol diacrylates and alkylene glycol dimethacrylates such as ethylene glycol diacrylate, ethylene glycol dimethacrylate, 1,3-butylene glycol diacrylate, 1,3-butylene glycol dimethacrylate, 1,4-butylene glycol diacrylate, 1,4-butylene glycol dimethacrylate, propylene glycol diacrylate and propylene glycol dimethacrylate; polyvinyl benzenes such as divinyl benzene and trivinyl benzene; and allyl compounds such as allyl methacrylate, triallyl cyanurate and triallyl isocyanurate.

In polymerizing these reactive monomers for obtaining the emulsion type crosslinked polymer or copolymer, a polmerization degree regulating agent such as n-octylmercaptan or t-dodecylmercaptan may be used, and in many cases, it is preferred that the molecular weight distribution be adjusted by using this agent.

The fine particles of the emulsion type crosslinked polymer or copolymer are incorporated in an amount of 0.5 to 30 parts by weight, preferably 2 to 20 parts by weight, per 100 parts by weight of the monomer mixture (A). If the amount of the fine particles is smaller than 0.5 part by weight per 100 parts by weight of the mixture (A), no sufficient delustering effect can be obtained, and if the amount of the fine particles is larger than 30 parts by weight per 100 parts by weight of the monomer mixture (A), the abrasion resistance and scratch resistance of the delustered, crosslinked, cured coating are degraded.

The coating composition comprising the monomer mixture (A) and fine particulate crosslinked polymer or copolymer may be cured by activation energy rays, for example, electron beams ordinarily generated from an electron beam accelerator of 20 to 2000 KV, and radiations such as $\alpha$-rays, $\beta$-rays and $\gamma$-rays, but in order to effect curing economically advantageously, it is preferred that the coating composition be irradiated with ultraviolet rays having a wavelength of 100 to 500 nm. As the atmosphere for irradiation with ultraviolet rays, there may be used inert gases such as nitrogen, carbon dioxide gas and argon, but if irradiation is carried out by using the above-mentioned specific compound having acryloyloxy groups, curing can be effected more efficiently even in air and optimum results can be obtained.

In the case where an ultraviolet ray is used as the activation energy ray, it is preferred that a photocatalyst or photosensitizer be added to the monomer mixture (A). As the photocatalyst or photosensitizer, there can be mentioned, for example, carbonyl compounds such as benzoin, benzoin methyl ether, benzoin ethyl ether, benzoin isopropyl ether, acetoin, butyroin, toluoin, benzil, benzophenone, p-methoxybenzophenone, diethoxyacetophenone, $\alpha\beta$-dimethoxy-$\alpha$-phenylacetophenone, methylphenyl glyoxylate, ethylphenyl glyoxylate, 4,4'-bis(dimethylaminobenzophenone) and 2-hydroxy-2-methyl-1-phenylpropan-1-one; sulfur compounds such as tetramethyl thiuram monosulfide and tetramethyl thiuram disulfide; axo compounds such as azobisisobutyronitrile and azobis-2,4-dimethylvaleronitrile; and peroxide compounds such as benzoyl peroxide and di-t-butyl peroxide. It is preferred that the photocatalyst or photosensitizer be added in an amount of 0.01 to 6 parts by weight per 100 parts by weight of the monomer mixture (A). If the photocatalyst or photosensitizer is used in too large an amount, the crosslinked cured coating is colored and the weatherability is reduced, and if the amount of the photocatalyst or photosensitizer is too small, the curability with ultraviolet rays is reduced.

In addition to the above-mentioned indispensable constituents of the coating composition of the present invention, in order to impart the antistatic property, fog resistance and other properties to the crosslinked cured coating, at least one vinyl monomer having an ultraviolet ray polymerization activity may be added if necessary. Furthermore, a stabilizer such as an antioxidant, a photostabilizer, a heat polymerization inhibitor or an ultraviolet ray absorber, and a colorant and the like may be added in small amounts according to need.

If it is especially required to impart good smoothness and uniformity to the coating formed on the surface of the obtained molded article, it is preferred that a small amount of a silicone type leveing agent be incorporated. A silicone type leveing agent comprising polydimethylsiloxane units partially modified with polyoxyalkylene groups is preferred, and the degree of modification is preferably such that 0.1 to 10 units of at least one oxyalkylene group

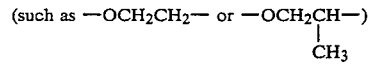

are bonded per unit of the methylsiloxane group $[CH_3(SiO)_{\frac{1}{2}}-]$. If the degree of modification with the oxyalkylene group is lower than 0.1, the smoothness of the coating is rather worse than the smoothness of the coating obtained without addition of the silicone type surface active agent. If the degree of modification with the oxyalkylene group exceeds 10, the smoothness of the coating is reduced and no good results are obtained. When the silicone type leveling agent is not used, it sometimes happens that the resulting delustered molded article is opaque, but this phenomenon is prevented if a small amount of the silicone type leveling agent is incorporated.

As the coating method, there may be adopted a brush coating method, a flow coating method, a spray coating method, a spin coating method and a dip coating method. However, in view of the adaptability of the coating composition to the coating operation, the smoothness and uniformity of the coating and the adhesion of the cured coating to the substrate, it is preferred that the coating operation be carried out according to the dip coating method using an appropriate solvent.

The amount used of the organic solvent is preferably 100 to 2000 parts by weight per 100 parts by weight of the monomer mixture (A). If the amount used of the organic solvent is smaller than 100 parts by weight per 100 parts by weight of the monomer mixture, a coating excellent in the smoothness and uniformity cannot be obtained, and if the amount used of the organic solvent is larger than 2000 parts by weight per 100 parts by weight of the monomer mixture (A), the coating becomes too thin and the abrasion resistance and scratch resistance are often reduced.

The coating composition is coated on the surface of a synthetic resin molded article in such an amount that the thickness of the cured coating is 1 to 30$\mu$, preferably 1.5 to 20$\mu$. If the thickness of the crosslinked cured coating is smaller than 1μ, the effect of improving the weatherability is inferior and if the thickness of the crosslinked cured coating is larger than 30μ, the adhesion to the substrate is degraded and cracking or haze is readily caused.

As the synthetic resin molded article to be used for the production of a delustered synthetic resin molded article excellent in the abrasion resistance and scratch resistance in the present invention, there can be mentioned various molded articles of synthetic resins such as thermoplastic resins and thermosetting resins. For example, sheets, films, rods and injection-molded articles prepared from polymethyl methacrylate resins, polycarbonate resins, polyallyl diglycol carbonate resins, acrylonitrile-styrene copolymer resins (AS resins), polyvinyl chloride resins, acetate resins, ABS resins and polyester resins. Among these molded articles, molded articles prepared from polymethyl methacrylate resins and polycarbonate resins are often used while characteristic properties of these resins such as optical characteristics, heat resistance and impact strength are effectively utilized and improvements of the abrasion resistance and weatherability are highly required in these molded articles. Accordingly, molded articles of polymethyl methacrylate resins and polycarbonate resins are especially preferred as the synthetic resin molded article in the present invention.

The coating composition of the present invention and a delustered synthetic resin molded article excellent in the abrasion resistance and scratch resistance, which is prepared by using the coating composition of the present invention, are excellent in the smoothness, chemical resistance and durability, and therefore, they can effectively be used in the fields where the delustering property is required, for example, for the production of CRT filters, television filters, taxi meters, display devices such as digital display plates, illuminating and optical devices, fluorescent display tube filters and liquid crystal filters.

The present invention will now be described in detail with reference to the following Examples. In the Examples, all of "parts" are by weight.

The scratch resistance and definition were determined and evaluated as follows.

SCRATCH RESISTANCE

Incidentally, the scratch resistance was determined and evaluated according to the following method.

Steel wool #000 was attached to the top end of a cylinder having a diameter of 25 mm, and the top end of the cylinder was brought into contact with the surface of a sample horizontally placed. The cylinder was turned 5 times (20 rpm) under a load of 100 g, and the degree of scratching on the sample surface was observed with the naked eye. The scratch resistance was evaluated according to the following rating:
- o: sample surface was not substantially scratched
- Δ: sample surface was scratched
- x: sample surface was considerably scratched

DEFINITION

A sample delustered plate was placed at a distance of ½ in. from a definition power chart and observed with a transmitted light by means of a 10×manifier. The used definition power chart was a line counter for a plate making screen of 250 lines/in. The definition was evaluated according to the following rating:
- o: lines of 250 lines/in were clearly confirmed, indicating high definition
- Δ: lines of 250 lines/in were clearly confirmed when the delustered plate was placed in close contact with the definition power chart
- x: lines were not confirmed

EXAMPLES 1 THROUGH 5 AND COMPARATIVE EXAMPLES 1 AND 2

A composition comprising 10 parts of dipentaerythritol pentaacrylate, 10 parts of dipentaerythritol hexaacrylate, 8 parts of tetrahydrofurfuryl acrylate, 7 parts of an ester (TAS) obtained by reacting 1 mole of succinic acid and 2 moles of trimethylol ethane with 4 moles of adipic acid, 35 parts of isopropyl alcohol, 30 parts of toluene, 2 parts of 2-hydroxy-2-methyl-1-phenylpropan-1-one and 0.2 parts of a silicone type leveling agent was mixed with 6 parts of a fine particulate crosslinked copolymer composed of compounds shown in Table I to obtain a coating composition.

An acrylic resin plate (Acrylite L supplied by Mitsubishi Rayon) was dipped in the coating composition at a dipping speed of 1.0 cm/sec, and the coated plate was air-dried for 3 minutes and irradiated in air for 13 seconds with rays from a high pressure mercury lamp of 2 KW at an irradiation distance of 20 cm. The obtained results are shown in Table I.

TABLE I

| | | Example 1 | Example 2 | Example 3 | Example 4 | Example 5 | Comparative Example 1 | Comparative Example 2 |
|---|---|---|---|---|---|---|---|---|
| Crosslinked Copolymer | methyl methacrylate (parts) | — | — | 20 | 40 | 50 | 10 | 20 |
| | styrene (parts) | 60 | 60 | 40 | 30 | 30 | 10 | 40 |
| | ethyl acrylate (parts) | — | 40 | — | — | — | — | — |
| | butyl acrylate (parts) | 40 | — | 40 | 30 | 20 | 80 | 40 |
| | ethylene glycol dimethacrylate (parts) | 6 | 6 | 6 | 6 | 6 | 6 | not added |
| | results of polymerization | good | good | good | good | good | rubbery product | good |
| Properties of Delustered Molded Article | scratch resistance | o | o | o | o | o | — | o |
| | appearance (smoothness, etc.) | good | good | good | good | good | — | bad (melt adhering) |
| | gloss (60°) | 60 | 60 | 65 | 65 | 70 | — | — |

The crosslinked copolymer was prepared in the following manner.

A reaction vessel equipped with a stirrer, a reflux cooler and a nitrogen gas inlet was charged with 250 parts of water, monomers shown in Table I, 2 parts of an emulsifier and 0.3 part of potassium persulfate, and the inside atmosphere of the reaction vessel was sufficiently replaced by nitrogen gas. Polymerization was carried out at 75° C. with stirring for 5 hours to obtain a latex at a polymerization ratio of about 96%. According to the optical transmission method, it was confirmed that the particle size was 0.2 to 0.3μ. Then, 5 parts of calcium chloride was added to the latex to effect salting-out, and the precipitated polymer was dehydrated, washed with water and dried to obtain a powdery polymer except in Comparative Example 1.

EXAMPLE 6 AND COMPARATIVE EXAMPLES 3 THROUGH 5

A reaction vessel similar to that used for the preparation of the crosslinked copolymer shown in Table I was charged with a monomer mixture comprising 60 parts of styrene, 20 parts of ethyl acrylate, 20 parts of methyl methacrylate and 5 parts of triallyl cyanurate, 2 parts of an emulsifier and 0.2 part of benzoyl peroxide, and the inside atmosphere of the reaction vessel was sufficiently replaced by nitrogen gas and polymerization was carried out at 75° C. for 5 hours with stirring to obtain a latex at a polymerization ratio of 95%. According to the optical transmission method, it was confirmed that the particle size was 0.2 to 0.3μ. A powdery crosslinked polymer was prepared from this latex as in case of the powdery crosslinked polymer shown in Table I.

A composition comprising 5 parts of dipentaerythritol tetraacrylate, 8 parts of dipentaerythritol pentaacrylate, 7 parts of dipentaerythritol hexaacrylate, 5 parts of tetrahydrofyrfuryl acrylate, 5 parts of TAS, 35 parts of isobutyl alcohol, 35 parts of xylene, 2 parts of 1-(4-isopropylphenyl)-2-hydroxy-2-methylpropan-1-one and 0.1 part of a silicone type leveling agent was mixed with 5 parts of the above-mentioned crosslinked polymer or fine particles of silica (Syloid-244), titanium oxide (Aerosil-Titanium P-25) or aluminum oxide (Aerosil-Aluminium Oxide Co.)

An acrylic plate was dipped in the obtained coating composition in the same manner as in Examples 1 through 5 and a cured molded article was obtained. The obtained results are shown in Table II. In order to examine the storage stability, the coating composition was allowed to stand still for 3 days. Also the stability test results are shown in Table II.

TABLE II

| | | Example 6 | Comparative Example 3 | Comparative Example 4 | Comparative Example 5 |
|---|---|---|---|---|---|
| Additive | | crosslinked copolymer | silica | titanium oxide | aluminum oxide |
| Properties of Delustered Molded Article | Scratch resistance | o | o | o | o |
| | Appearance (smoothness, etc.) | good | bad (non-uniform, opaque) | bad (non-uniform, opaque) | bad (non-uniform, opaque) |
| | gloss (60°) | 60 | 50 | 40 | 40 |
| Storage Stability | (3 days) | good | bad (precipitation in lower portion) | bad (precipitation in lower portion) | bad (precipitation in lower portion) |

EXAMPLES 7 THROUGH 12 AND COMPARATIVE EXAMPLES 6 AND 7

A composition comprising 10 parts of dipentaerythritol pentaacrylate, 10 parts of dipentaerythritol hexacrylate, 8 parts of tetrahydrofurfuryl acrylate, 7 parts of an ester (TAS) obtained by reacting 1 mole of succinic acid and 2 moles of trimethylol ethane with 4 moles of adipic acid, 35 parts of isopropyl alcohol, 30 parts of toluene, 2 parts of 2-hydroxy-2-methyl-1-phenylpropan-1-phenylpropan-1-one and 0.2 part of a silicone type leveling agent was mixed with 6 parts of a fine particulate crosslinked copolymer composed of compounds shown in Table II to obtain a coating composition.

An acrylic resin plate (Acrylite L supplied by Mitsubishi Rayon) was dipped in the coating composition at a dipping speed of 1.0 cm/sec, and the coated plate was air-dried for 3 minutes and irradiated in air for 13 seconds with rays from a high pressure mercury lamp of 2 KW at an irradiation distance of 20 cm. The obtained results are shown in Table III.

TABLE III

| | | | Example 7 | Example 8 | Example 9 | Example 10 | Example 11 | Example 12 | Comparative Example 6 | Comparative Example 7 |
|---|---|---|---|---|---|---|---|---|---|---|
| Crosslinked Copolymer | first stage | methyl methacrylate (parts) | 20 | 20 | 25 | 25 | 30 | 25 | 25 | 25 |
| | | butyl acrylate (parts) | — | — | 5 | 5 | — | 5 | 5 | 5 |
| | | styrene (parts) | 10 | 10 | — | — | — | — | — | — |
| | | allyl methacrylate (parts) | 1 | 1 | 1 | 1 | 1 | 1 | 1 | 1 |
| | second stage | methyl methacrylate (parts) | — | 15 | — | 15 | — | 10 | — | — |
| | | butyl acrylate (parts) | 25 | 25 | 25 | 25 | 25 | 20 | 25 | 55 |
| | | styrene (parts) | 45 | 30 | 45 | 30 | 45 | 40 | 45 | 15 |
| | | ethylene glycol dimethacrylate (parts) | 3 | 3 | 5 | 5 | 3 | 4 | 0 | 3 |
| | results | of polymerization | good | good | good | good | good | good | good | rubbery product |
| Properties of Delustered Molded Article | | scratch resistance | o | o | o | o | o | o | o | — |
| | | appearance (smoothness, etc.) | good | good | good | good | good | good | bad (melt adhering) | — |
| | | gloss (60°) | 35 | 40 | 30 | 35 | 35 | 35 | — | — |

The crosslinked copolymer was prepared in the following manner.

A reaction vessel equipped with a stirrer, a reflux cooler and a nitrogen gas inlet was charged with 250 parts of water, monomers shown as the first stage monomer in Table III, 0.06 part of an emulsifier and 0.1 part of potassium persulfate, and the inside atmosphere of the reaction vessel was sufficiently replaced by nitrogen gas. Polymerization was carried out at 75° C. with stirring for 2 hours. Thereafter, monomers shown as the second stage monomer in Table III, 0.7 part of an emulsifier and 0.4 part of benzoyl peroxide were introduced into the vessel and polymerization was carried out for further 5 hours. A latex of a polymerization ratio of 96% was obtained. According to the optical transmission method, it was confirmed that the particles in the latex had a particle size of 0.5 to 0.6μ. Then, 5 parts of calcium chloride was added to the latex to effect salting-out, and the precipitated polymer was dehydrated, washed with water and dried to obtain a powdery polymer except in Comparative Example 7.

EXAMPLE 13

A composition comprising 5 parts of dipentaerythritol tetraacrylate, 8 parts of dipentaerythritol pentaacrylate, 7 parts of dipentaerythritol hexaacrylate, 5 parts of tetrahydrofyrfuryl acrylate, 5 parts of TAS, 35 parts of isobutyl alcohol, 35 parts of xylene, 2 parts of 1-(4-isopropylphenyl)-2-hydroxy-2-methylpropan-1-one and 0.1 part of a silicone type leveling agent was mixed with 5 parts of fine particles of a crosslinked copolymer obtained by the procedure used in Example 12.

An acrylic plate was dipped in the resultant coating composition in the same manner as in Example 7 through 12 and a cured molded article was obtained. Further, the storage stability of the coating composition was examined by allowing to stand for 3 days.

The obtained delustered molded article had a good appearance, scratch resistance rating as 0 and 60° gloss of 35. The coating composition had a good storage stability.

EXAMPLES 14 THROUGH 20

A reaction vessel similar to that used in Examples 1 through 5 was charged with 250 parts of water, monomers shown as the first stage monomer in Table IV, 0.06 part of an emulsifier and 0.1 part of potassium persulfate, and well purged with nitrogen gas, and polymerization was carried out at 75° C. for 2 hours. Then, monomers shown as the second stage monomer in Table IV, 0.7 part of an emulsifier and 0.04 part of benzoyl peroxide were introduced into the vessel and polymerization was carried out for further 5 hours. A latex of a polymerization ratio of 96% was obtained. According to the optical transmission method, it was confirmed that the particles in the latex had a particle size of 0.5 to 0.6μ. Then, 5 parts of calcium chloride was added to the latex to effect salting out, and the precipitated polymer was dehydrated, washed with water and dried to obtain a powdery polymer B-1, B-2 or B-3.

The polymers as used in Examples 1 through 5 were labelled as A-1, A-2, A-3, A-4 and A-5, respectively, and were employed as crosslinked copolymers of a mono-layer structure.

TABLE IV

| | | | B-1 | B-2 | B-3 |
|---|---|---|---|---|---|
| Crosslinked Copolymer | first stage | methyl methacrylate (parts) | 25 | 20 | 30 |
| | | butyl acrylate (parts) | 5 | — | — |
| | | styrene (parts) | — | 10 | — |
| | | allyl methacrylate (parts) | 1 | 1 | 1 |
| | second stage | methyl methacrylate (parts) | — | — | — |
| | | butyl acrylate (parts) | 25 | 25 | 20 |
| | | styrene (parts) | 45 | 45 | 50 |
| | | allyl methacrylate (parts) | 3 | 4 | 3 |

Each of the mixtures of the crosslinked copolymers was mixed with a composition comprising 10 parts of dipentaerythritol pentaacrylate, 10 parts of dipentaerythritol hexaacrylate, 8 parts of tetrahydrofurfuryl acrylate, 7 parts of an ester (TAS) obtained by reacting 1 mole of succinic acid and 2 moles of trimethylol ethane with 4 moles of adipic acid, 35 parts of isopropyl alcohol, 30 parts of toluene, 2 parts of 2-hydroxy-2-methyl-1-phenylpropan-1-one and 0.2 part of a silicone type leveling agent, in an amount as shown in Table V, to obtain a coating composition.

An acrylic resin plate (Acrylite L supplied by Mitsubishi Rayon) was dipped in the coating composition at a dipping speed of 1.0 cm/sec, and the coated plate was air-dried for 3 minutes and irradiated in air for 13 seconds with rays from a high pressure mercury lamp of 2 KW at an irradiation distance of 20 cm. The obtained results are shown in Table V.

TABLE V

| | | Example 14 | Example 15 | Example 16 | Example 17 | Example 18 | Example 19 | Example 20 |
|---|---|---|---|---|---|---|---|---|
| Mixture of Particulate Crosslinked Copolymer | | B-1 4 parts | B-2 4 parts | B-3 4 parts | B-1 6 parts | | B-1 5.5 parts | B-1 0.5 parts |
| | | A-5 2 parts | A-5 2 parts | A-5 2 parts | | A-5 6 parts | A-5 0.5 parts | A-5 5.5 parts |
| Properties of Delustered Molded Article | scratch resistance | o | o | o | o | o | o | o |
| | appearance (smoothness, etc.) | good | good | good | good | good | good | good |
| | gloss (60°) | 30 | 35 | 35 | 30 | 70 | 30 | 65 |
| | definition | o | o | o | Δ | o | o~Δ | o |

EXAMPLES 21 THROUGH 28

A composition comprising 5 parts of dipentaerythritol tetraacrylate, 8 parts of dipentaerythritol pentaacrylate, 7 parts of dipentaerythritol hexaacrylate, 5 parts of tetrahydrofyrfuryl acrylate, 5 parts of TAS, 35 parts of isobutyl alcohol, 35 parts of xylene, 2 parts of 1-(4-isopropylphenyl)-2-hydroxy-2-methylpropan-1-one and 0.1 part of a silicone type leveling agent was mixed with a crosslinked polymer A-1, A-2, A-3, A-4 or A-5 as used in Examples 14 through 20 in an amount shown in Table VI and a crosslinked polymer B-1, B-2 or B-3 as used in Examples 14 through 20 in an amount shown in Table VI, to obtain a coating composition.

An acrylic plate was dipped in the obtained coating composition in the same manner as in Examples 14 through 20 and a cured molded article was obtained.

The results are shown in Table VI.

TABLE VI

|  |  | Example 21 | Example 22 | Example 23 | Example 24 | Example 25 | Example 26 | Example 27 | Example 28 |
|---|---|---|---|---|---|---|---|---|---|
| Mixture of Particulate Crosslinked Copolymer | | B-2 3 parts A-1 3 parts | B-2 3 parts A-2 3 parts | B-2 3 parts A-3 3 parts | B-2 3 parts A-4 3 parts | B-3 3 parts A-1 3 parts | B-3 3 parts A-2 3 parts | B-3 3 parts A-3 3 parts | B-3 3 parts A-4 3 parts |
| Properties of Delustered Molded Article | scratch resistance | o | o | o | o | o | o | o | o |
| | appearance (smoothness, etc.) | good | good | good | good | good | good | good | good |
| | gloss (60°) | 35 | 35 | 40 | 40 | 35 | 35 | 40 | 40 |
| | definition | o | o | o | o | o | o | o | o |

We claim:

1. A coating composition curable by an activation energy ray, which comprises (a) 100 parts by weight of a monomer mixture (A) comprising at least 30% by weight of a compound having at least 3 acryloyloxy and/or methacryloyloxy groups in the molecule and up to 70% by weight of a compound having 1 to 2 $\alpha,\beta$-ethylenically unsaturated bonds in the molecule, (b) 0.01 to 6.0 parts by weight of at least one photosensitizer and (c) 0.5 to 30 parts by weight of a crosslinked polymer or copolymer obtained by emulsion copolymerization of a reactive monomer having one $\alpha,\beta$-ethylenically unsaturated bond in the molecule and a reactive monomer having at least two $\alpha,\beta$-ethylenically unsaturated bonds in the molecule.

2. The coating composition as claimed in claim 1, wherein the crosslinked polymer or copolymer is composed of fine particles having a particle size of 0.05 to 3.0μ.

3. The coating composition as claimed in claim 1, wherein the crosslinked polymer or copolymer is a polymer of 75 to 99% by weight of a reactive monomer having one $\alpha,\beta$-ethylenically unsaturated bond in the molecule and 1 to 25% by weight of a reactive monomer having at least two $\alpha,\beta$-ethylenically unsaturated bonds in the molecule.

4. The coating composition as claimed in claim 1, wherein the crosslinked polymer or copolymer is a multi-stage crosslinked polymer or polymer comprising:
   (a) an inner layer obtained by emulsion copolymerization composed of a copolymer of 85 to 99.9% by weight of a reactive monomer having one $\alpha,\beta$-ethylenically unsaturated bond in the molecule and 0.1 to 15% by weight of a graft crosslinking agent having at least two $\alpha,\beta$-ethylenically unsaturated bonds in the molecule; and
   (b) an outermost layer obtained by emulsion copolymerization composed of a crosslinked copolymer of 75 to 99% by weight of a reaction monomer having one $\alpha,\beta$-ethylenically unsaturated bond in the molecule and 1 to 25% by weight of a reactive monomer having at least two $\alpha,\beta$-ethylenically unsaturated bonds in the molecule.

5. The coating composition as claimed in claim 4, wherein the multi-layer crosslinked polymer or copolymer is a two stage polymer or copolymer having one inner layer and one outermost layer.

6. The coating composition as claimed in claim 4, wherein the graft crosslinking agent having at least two $\alpha,\beta$-ethylenically unsaturated bonds in the molecule is allyl methacrylate, triallyl cyanurate or triallyl isocyanurate.

7. The coating composition as claimed in claim 1, wherein the crosslinked polymer or copolymer of a mixture of
   (1) a one-layer crosslinked polymer or copolymer obtained by emulsion copolymerization of
      (a) 75 to 99% by weight of a reactive monomer having one $\alpha,\beta$-ethylenically unsaturated bond in the molecule and
      (b) 1 to 25% by weight of a reactive monomer having at least two $\alpha,\beta$-ethylenically unsaturated bonds in the molecule with
   (2) a multi-layer crosslinked polymer or copolymer obtained by emulsion polymerization comprising
      (c) an inner layer composed of a copolymer of 85 to 99.9% by weight of a reactive monomer having one $\alpha,\beta$-ethylenically unsaturated bond in the molecule and 0.1 to 15% by weight of a graft crosslinking agent having at least two $\alpha,\beta$-ethylenically unsaturated bonds in the molecule and
      (d) an outermost layer composed of a crosslinked copolymer of 75 to 99% by weight of a reactive monomer having one $\alpha,\beta$-ethylenically unsaturated bond in the molecule and 1 to 25% by weight of a reactive monomer having at least two $\alpha,\beta$-ethylenically unsaturated bonds in the molecule.

8. The coating composition as claimed in claim 7, wherein the multi-layer crosslinked polymer or copolymer is a two stage polymer or copolymer having one inner layer and one outermost layer.

9. The coating composition as claimed in claim 7, wherein the graft crosslinking agent having at least two $\alpha,\beta$-ethylenically unsaturated bonds in the molecule is selected from the group consisting of allyl methacrylate, triallyl cyanurate and triallyl isocyanurate.

10. The coating composition as claimed in claim 7, wherein the weight ratio of the fine particles composed of the one stage emulsion type crosslinked polymer or copolymer to the fine particles composed of the multi-stage emulsion type crosslinked polymer or copolymer is in a range from 9/1 to 1/9.

11. The coating composition as claimed in claim 7, wherein
    the fine particles composed of the one stage crosslinked polymer or copolymer have a particle size of 0.05 to 0.3μ, and
    the fine particles composed of the multi-layer crosslinked polymer or copolymer have a particle size of 0.3 to 3.0μ.

12. The coating composition as claimed in claim 1, wherein the reactive monomer having one $\alpha,\beta$-ethylenically unsaturated bond in the molecule is an acrylic acid alkyl ester having 1 to 13 carbon atoms in the alkyl group and/or a methacrylic acid alkyl ester having 1 to 4 carbon atoms in the alkyl group and/or an aromatic vinyl monomer.

13. The coating composition as claimed in claim 12, wherein the weight ratio of the methacrylic acid alkyl ester and/or the aromatic vinyl monomer to the acrylic acid alkyl ester in the outermost layer of the multi-stage emulsion type crosslinked polymer or copolymer is in a range from 99.5/0.5 to 40/60.

14. The coating composition as claimed in claim 1, wherein the reactive monomer having at least two $\alpha,\beta$-ethylenically unsaturated bonds is an alkylene glycol diacrylate or alkylene glycol dimethacrylate selected from the group consisting of ethylene glycol diacrylate, ethylene glycol dimethacrylate, 1,3-butylene glycol diacrylate, 1,3-butylene glycol dimethacrylate, 1,4-butylene glycol diacrylate, 1,4-butylene glycol dimethacrylate, propylene glycol diacrylate and propylene glycol dimethacrylate;

a polyvinylbenzene selected from the group consisting of divinylbenzene or trivinylbenzene; or an allyl compound selected from the group consisting of allyl methacrylate, triallyl cyanurate and triallyl isocyanurate.

15. The coating composition as claimed in claim 1, wherein the average molecular weight of the mixture (A) comprising the compound having at least 3 acryloyloxy and/or methacryloyloxy groups in the molecule and the compound having 1 to 2 $\alpha,\beta$-ethylenically unsaturated bonds in the molecule is smaller than 300 per polymerizable unsaturated group.

16. The coating composition as set forth in claim 1, wherein an organic solvent is incorporated in an amount of 100 to 2000 parts by weight per 100 parts by weight of the mixture (A).

17. The coating composition as set forth in claim 1, wherein the compound having at least 3 acryloyloxy and/or methacryloyloxy groups in the molecule is at least one member selected from compounds of the formula (I):

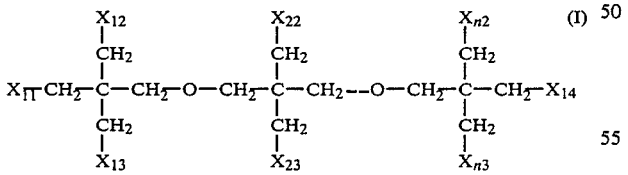

wherein
at least 3 of $X_{11}$, $X_{12}$, $X_{22}$, $X_{23}$, - - -, $X_{n2}$, $X_{n3}$ and $X_{14}$ are groups $CH_2=CH-COO-$,
the remaining groups are hydroxyl, amino, alkylene or substituted alkylene groups, and
n is an integer of from 2 to 5.

18. The coating composition as claimed in claim 17, wherein the polyfunctional monomer represented by the formula (I) is a member selected from the group consisting of dipentaerythritol triacrylate, dipentaerythritol tetraacrylate, dipentaerythritol pentaacrylate and dipentaerythritol hexaacrylate.

19. The coating composition as claimed in claim 1, wherein the compound having at least 3 acryloyloxy and/or methacryloyloxy groups in the molecule is a mixture of a compound of the formula (I):

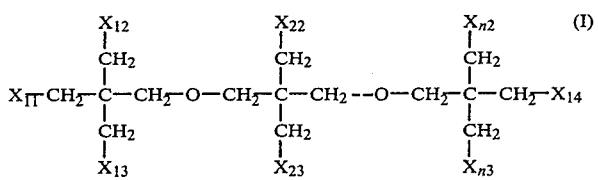

wherein
at least 3 of $X_{11}$, $X_{12}$, $X_{22}$, $X_{23}$, - - -, $X_{n2}$, $X_{n3}$ and $X_{14}$ are groups $CH_2=CH-COO-$,
the remaining groups are selected from the group consisting of hydroxyl, amino, alkylene and substituted alkylene groups, and
n is an integer of from 2 to 5 and
a compound of the formula (II):

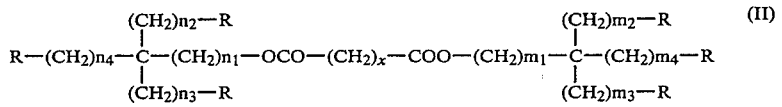

wherein
at least 3 of the R groups are groups $CH_2=CH-COO-$,
the remaining groups R are selected from the group consisting of —H, hydroxyl, amino, alkylene and substituted alkylene groups,
$n_1$, $n_2$, $n_3$, $m_1$, $m_2$, $m_3$ and $m_4$ are 0, 1 or 2, and
x is an integer of from 1 to 10.

20. The coating composition as claimed in claim 19, wherein the ratio of the compound (I) to the compound (II) is from 5/1 to 1/5.

21. The coating composition as claimed in claim 19, wherein the polyfunctional monomer represented by the formula (I) is a member selected from the group consisting of dipentaerythritol triacrylate, dipentaerythritol tetraacrylate, dipentaerythritol pentaacrylate and dipentaerythritol hexaacrylate.

22. The coating composition as claimed in claim 19, wherein the polyfunctional monomer of the formula (II) is a monomer selected from the group consisting of
an ester compound obtained by reacting malonic acid trimethylol ethane with acrylic acid,
an ester compound obtained by reacting malonic acid and trimethylol propane with acrylic acid,
an ester compound obtained by reacting succinic acid and trimethylol ethane with acrylic acid,
an ester compound obtained by reacting succinic acid and trimethylol propane with acrylic acid,
an ester compound obtained by reacting adipic acid and trimethylol ethane with an acrylic acid and
an ester compound obtained by reacting adipic acid and trimethylol propane with acrylic acid.

23. The coating composition as claimed in claim 1, wherein the compound having 1 to 2 $\alpha,\beta$-ethylenically unsaturated bonds in the molecule is a compound having one acryloyloxy group in the molecule and having a hydroxyl group and/or a cyclic ether linkage and/or a linear ether linkage on the side chain.

24. The coating composition as set forth in claim 1, wherein the activation energy ray is an ultraviolet ray having a wavelength of 100 to 500 nm.

* * * * *